(12) United States Patent
Hamilton et al.

(10) Patent No.: US 9,204,620 B2
(45) Date of Patent: Dec. 8, 2015

(54) POST SURGICAL TREATMENT FOR QUADRUPEDS

(71) Applicants: Laura Mary Hamilton, Alpharetta, GA (US); Marlene H Palmer, Ormond Beach, FL (US); David G Douglas, Baxley, GA (US); Alan Cross, Alpharetta, GA (US)

(72) Inventors: Laura Mary Hamilton, Alpharetta, GA (US); Marlene H Palmer, Ormond Beach, FL (US); David G Douglas, Baxley, GA (US); Alan Cross, Alpharetta, GA (US)

(73) Assignee: Laura Mary Hamilton, Alpharetta, GA (US)

( * ) Notice: Subject to any disclaimer, the term of this patent is extended or adjusted under 35 U.S.C. 154(b) by 0 days.

(21) Appl. No.: 13/998,591

(22) Filed: Nov. 15, 2013

(65) Prior Publication Data

US 2014/0224189 A1  Aug. 14, 2014

Related U.S. Application Data

(60) Provisional application No. 61/727,159, filed on Nov. 16, 2012.

(51) Int. Cl.
*A01K 13/00* (2006.01)
*A61D 9/00* (2006.01)

(52) U.S. Cl.
CPC ............... *A01K 13/006* (2013.01); *A61D 9/00* (2013.01)

(58) Field of Classification Search
CPC ....... A01K 13/006; A01K 27/002; A61D 9/00
USPC ................... 119/850, 855, 856, 863
See application file for complete search history.

(56) References Cited

U.S. PATENT DOCUMENTS

| | | | | |
|---|---|---|---|---|
| 3,742,679 A | * | 7/1973 | Jordan | 54/79.1 |
| 4,662,156 A | * | 5/1987 | Oettel | 54/80.2 |
| 5,137,508 A | * | 8/1992 | Engman | 602/79 |
| 5,163,272 A | * | 11/1992 | Finley et al. | 54/80.1 |
| 5,184,762 A | * | 2/1993 | Nevitt | 224/148.6 |
| 5,361,563 A | * | 11/1994 | Llamas | 54/79.2 |
| D374,315 S | * | 10/1996 | Caditz | D30/145 |
| 6,058,890 A | * | 5/2000 | Harrell | 119/850 |
| 6,481,383 B1 | * | 11/2002 | Ross et al. | 119/850 |
| 6,571,745 B2 | * | 6/2003 | Kerrigan | 119/858 |
| 8,677,944 B2 | * | 3/2014 | Kissel, Jr. | 119/850 |
| 2003/0097707 A1 | * | 5/2003 | Bray | 2/410 |
| 2005/0072376 A1 | * | 4/2005 | Kerrigan | 119/850 |
| 2010/0043725 A1 | * | 2/2010 | Hall | 119/850 |
| 2010/0115895 A1 | * | 5/2010 | Prill | 54/79.2 |
| 2010/0206247 A1 | * | 8/2010 | Cheng et al. | 119/850 |
| 2011/0017151 A1 | * | 1/2011 | Simoni | 119/850 |
| 2013/0008393 A1 | * | 1/2013 | Backman et al. | 119/850 |
| 2013/0066409 A1 | * | 3/2013 | Hilton | 607/110 |
| 2014/0326196 A1 | * | 11/2014 | Lauscher | 119/720 |

* cited by examiner

*Primary Examiner* — Kristen Matter
(74) *Attorney, Agent, or Firm* — Brient Globerman, LLC

(57) ABSTRACT

The present invention relates to a protective garment for dogs and cats or other quadrupeds. Specifically, the garment is designed to protect wounds, incisions, surgical sites, and related lesions on the animal's body including thoracic and pelvic limbs, truncal area, and head and neck. Additionally the garment is designed to allow attachment of drain suction and similar medical devices.

18 Claims, 5 Drawing Sheets

POST SURGICAL TREATMENT FOR QUADRUPEDS

CROSS REFERENCE TO RELATED APPLICATIONS

This application claims the benefit of priority of U.S. Provisional Patent Application Ser. No. 61/727,159 filed Nov. 16, 2012 which is incorporated by reference herein in its entirety.

The present invention relates to a protective garment for dogs and cats or other quadrupeds. Specifically, the garment is designed to protect wounds, incisions, surgical sites, and related lesions on the animal's body including thoracic and pelvic limbs, truncal area, and head and neck. Additionally the garment is designed to allow attachment of drain suction and similar medical devices.

BACKGROUND OF THE INVENTION

In veterinary medicine, it is often necessary to prevent self-trauma in animal patients. Instinctively, animals lick and chew at wounds to clean them. While this behavior has an evolutionary advantage, with the advent of modern wound management techniques, licking behavior slows wound healing and makes wound management more difficult.

Animals also tend to dislike foreign materials attached to their body. These materials often include those meant to effect healing or assist in wound management, either surgical or traumatic. Surgical wounds are closed with sutures or staples. These materials inherently cause some irritation to the patient and instinctively patients attempt to remove them via scratching or chewing. Adhesive bandages provide little benefit as they can be easily removed by the patient and do not adhere well to fur.

The consequences of self induced trauma can be severe. Wound healing is typically delayed due to wound contamination, such as those caused by, etc. oral bacteria. The resulting wound infection may progress to deeper structures resulting in significant patient morbidity and medical expenses.

Classically Elizabethan collars have been used to prevent self induced trauma. These devices are problematic as they significantly restrict basic animal functions including vision, prehension of food, eating, and hearing. The devices are additionally irritating to the animal resulting is stress, discomfort, and behavioral abnormalities

SUMMARY OF THE INVENTION

The present invention describes a protective garment for dogs, cats and other quadrupeds that prevents the animal from licking or disturbing a treated area or disrupting stitches or sutures. This garment includes three pieces of multi-directional stretch fabric having a torso portion, a leg portion and a head portion. In one aspect of the garment, the leg portion is fully removable from the torso portion if needed for easier defecation or urination purposes The garment employs a multi-directional stretch fabric allowing for ease of motion while at the same time the snug fit disallows the quadruped the chance to reach the wounds, incisions, surgical sites, and/or related lesions on the quadruped's body. The garment is easy to remove and replace as needed A fastener closes the mid-section opening of the garment around the torso down the back. Another fastener is placed on the torso portion behind the head as well as on the end of the torso portion toward the tail to allow for the attachment of the leg portion whether it be the right or left thoracic or pelvic limb Another fastener is used on the side of the upper area of the torso portion to allow for the attachment of the strap around the thoracic area to the opposite side. Another fastener is used to secure the head portion of the garment to the head of the quadruped down to the brow area and covering the ears and neck area.

The torso portion of the garment is fitted with four loops sewn into both sides of the garment using a multi-directional stretch fabric; one loop is sewn into the left front side of the garment, one loop is sewn into the left back side of the garment, one loop is sewn into the right front side of the garment, and one loop is sewn into the right back side of the garment. The purpose of the loop design is to securely hold a drain suction or other medical device.

DETAILED DESCRIPTION

FIGS. 1a-3 describe various aspects of the present invention. As illustrated, the garment configuration allows a torso portion, 1, of the garment to be easily removed, a leg portion, 7, of the garment to be easily removed, a head portion, 11, of the garment which acts independently from the torso portion and leg portion, and which also is easily removed. In an important aspect, the protective garment of the invention may include three completely detachable pieces each made of a multi-directional four way stretch fabric. The leg portion, 7, is easily reattached to the torso portion, 1, of the garment by taking the fastening mechanism, 8, sewn into the leg portion and bringing it up to the fastening mechanism, either 9 and/or 10, sewn into the torso portion at both the nape area and rump area and securing.

Figure 1A:
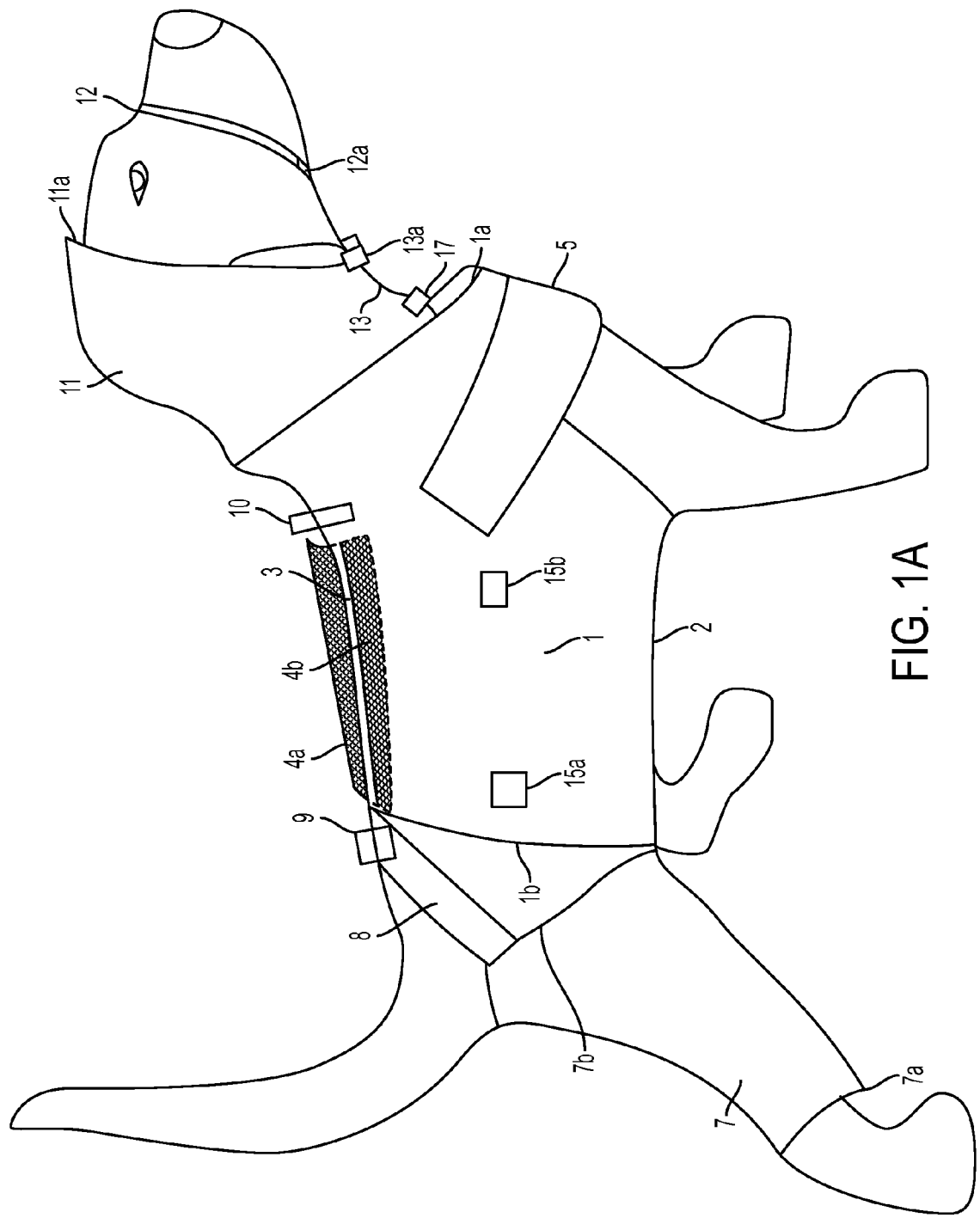
FIG. 1a shows a right side view of the torso portion, leg portion and head portion of the present invention.

FIG. 1a shows a right side view of one important aspect of the invention. In this aspect of the invention, the protective garment, using a multi-dimensional stretch fabric, having a torso portion, 1, a leg portion, 7, and a head portion, 11, wherein the protective garment includes a torso opening, 3, with one single piece of a multi-dimensional stretch fabric split on top of the back from the withers down towards the rump, allowing the torso portion that wraps under the belly area, 2, and around to the top torso opening, 3, to remain intact. The edges of the leg openings, 7a and 7b, the head opening, 11a, and the torso openings, 1a and 1 b, may be finished with a seam to prevent fraying.

Figure 1B:
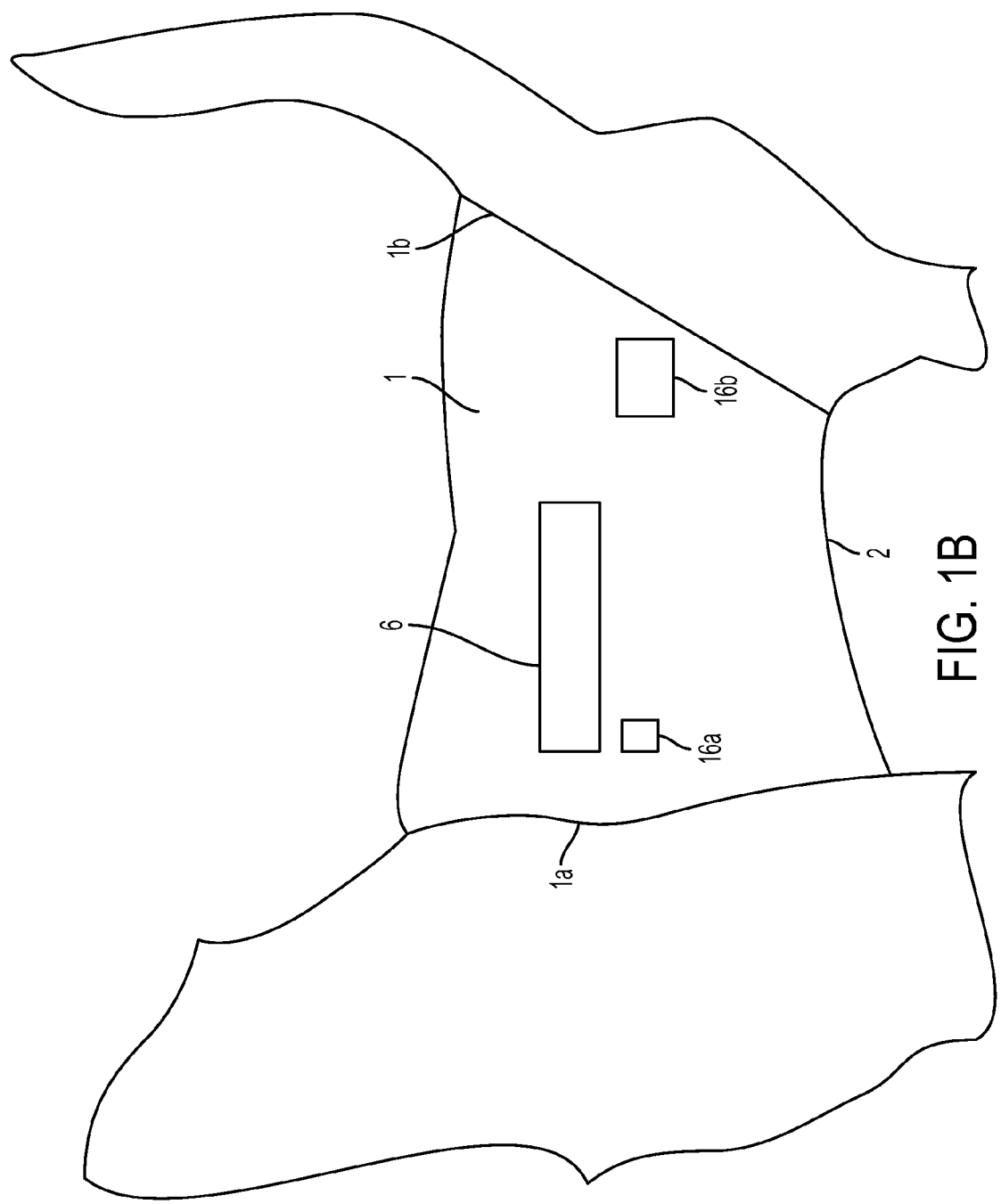
FIG. 1b shows a left side view of the torso portion of the present invention.
Figure 1C:
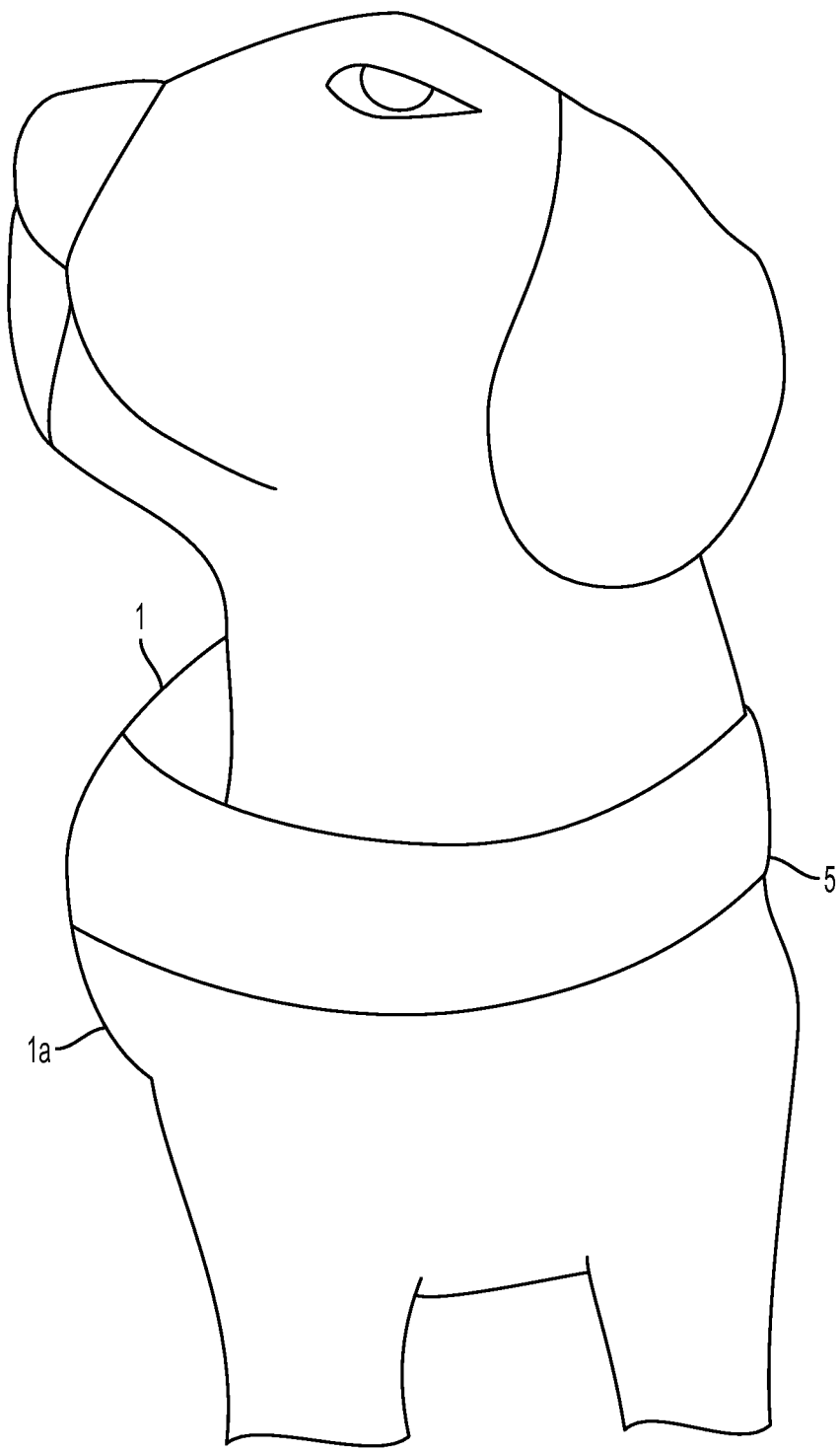
FIG. 1c shows a front view of the torso portion of the present invention.

FIG. 1a, FIG. 1b and FIG. 1c show in another important aspect of the invention, fasteners, 4a and 4b, close the torso opening, 3, of the garment. Another fastener, 6, as seen in FIG. 1 b, is placed on the left or right side of the garment on the torso portion, 1, at the shoulder area, and used to secure the thoracic strap, 5, as shown in FIG. 1c, further securing the garment to the body of the quadruped. Another fastener, 10, is sewn into the top of the torso portion of the garment closest to the nape of the neck for the purpose of securing the leg portion strap, 8, to the torso portion, 1, when leg portion, 7, is used on the right and/or left forelegs. Another fastener, 9, is sewn into the top of the torso portion, 1, closest to the rump for the purpose of securing the leg portion, 7, to the torso portion, 1, when the leg portion, 7, is used on the right and/or left hind legs. Other fasteners, 12a and 13a, are used to secure the head portion to the head of the quadruped.

Figure 3:
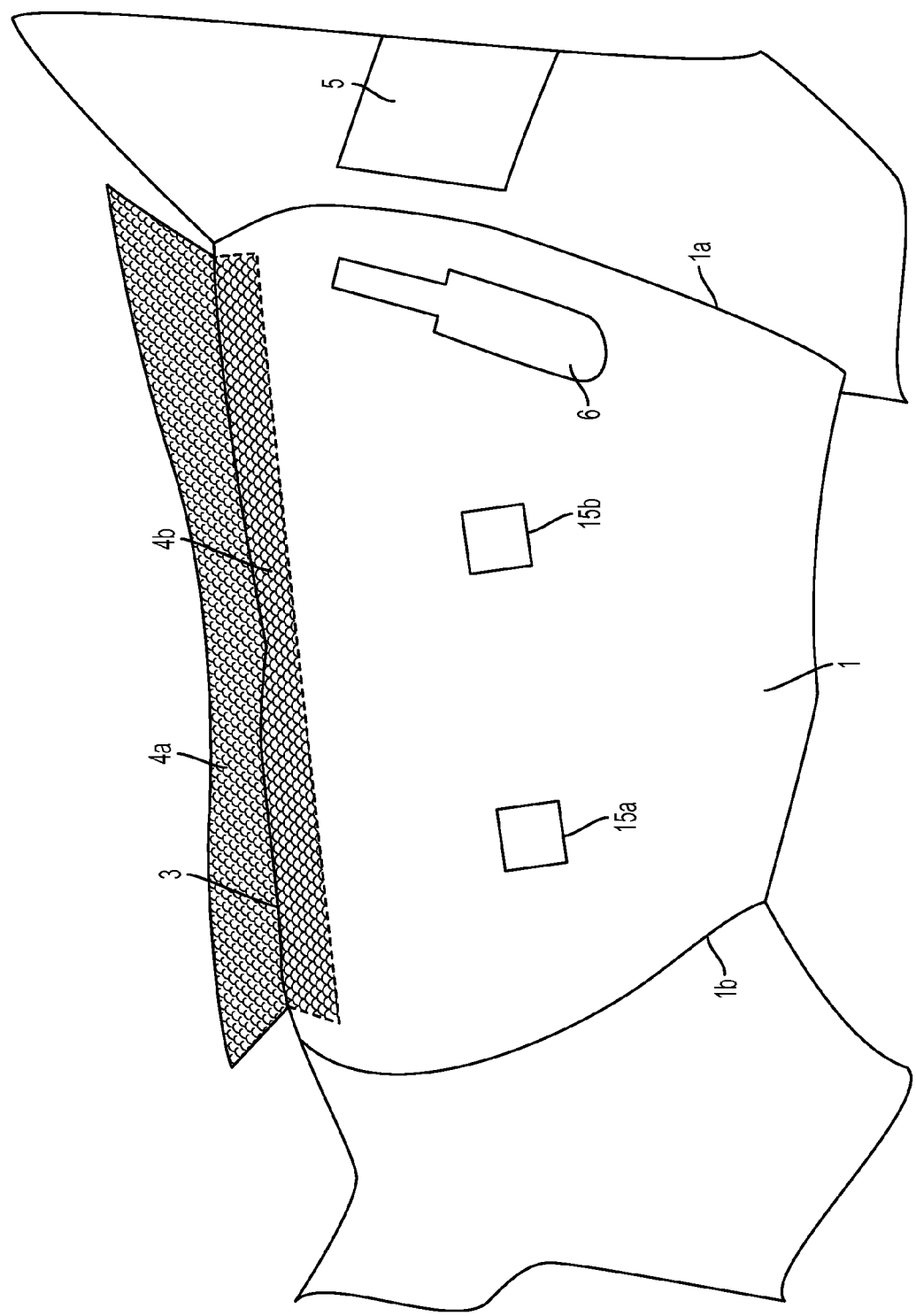
FIG. 3 shows a top view of torso portion of the present the invention

FIG. 1a and FIG. 1b, in another important aspect of the invention, show that the fasteners, 4a and 4b, 9, 10, 12a and 13a, as seen in FIG. 1a, and fastener, 6, as seen in FIGS. 1b and 3, may include hook and eye, snaps, zippers, buttons or other fasteners within the scope of the invention. In a very important aspect of the invention, VELCRO® may be used as the fastener due to its ability to fasten securely and easily.

FIG. 1a and FIG. 1b show another important aspect of the invention. In this aspect using the same multi-directional stretch fabric, loops, 15a and 15b, as seen in FIG. 1a, are sewn into the right side of the torso portion, 1, of the garment and loops, 16a and 16b, as seen in FIG. 1b, are sewn into the left side of the torso portion, 1, for the purpose of securely attaching a drainage bulb or other medical device to the quadruped.

Figure 2:
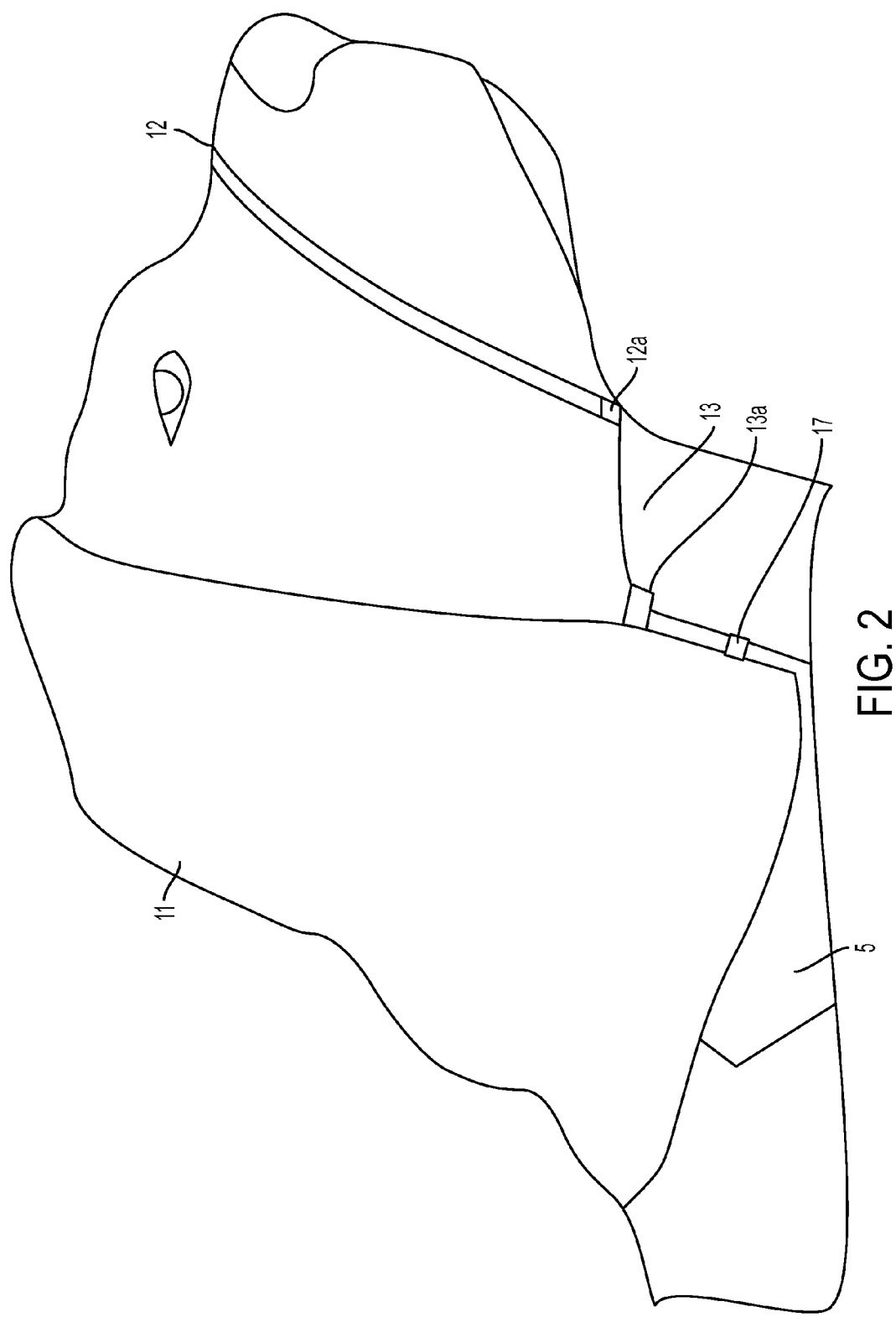
FIG. 2 shows a right side view of the head portion of the present invention.

FIG. 2 shows a right side view of the protective garment of the present invention focusing on the head portion. The head portion, 11, of the protective garment shown in FIG. 2 includes a single piece of multi-directional stretch fabric, which fits comfortably over the quadrupeds head, ears and neck areas and is secured around the neck area using fastening mechanism, 12a, 13a and 17.

In another important aspect of the head portion, 11, of the protective garment shows the head portion, 11, is further secured to the head of the quadruped by using a strap, 12, to fit across the bridge of the nose and connect using the fastening mechanism, 12a, to connect to both the left and right side at the upper region of the head portion, 11, and the head portion, 11, is further secured to d by using a strap, 13, to fit comfortably under the chin and connect using fastening mechanisms, 13a and 17, to connect to both the left and right side at the lower region of the head. In an important aspect of the head portion, 11, it may be finished with a seam to prevent fraying FIG. 3 shows a top view of the protective garment. In an important aspect of the invention, and as further shown in FIG. 1a and FIG. 1b, the torso portion, 1, has a top portion opening, 3, which splits the top of the torso portion, 1. The opening has a seam on each side, and a fastening mechanism, 4a and 4b, is placed longitudinally on either side of the top portion opening, 3. In an important aspect of the invention, the fastening mechanism, 4a and 4b, may be Velcro positioned such that a female side, 4a, of the Velcro is on one side of the opening, and a male side, 4b, of the Velcro fastener is positioned on the opposite side of the opening.

The stretch factor of this fabric allows for a substantial range of motion by the dog or cat or other quadruped and ease of manipulation of the garment in the dressing and undressing of the dog or cat or other quadruped by the user.

In an alternative aspect of the invention, the protective garment may be replaced by or include other materials allowing the comfort and ease of use as discussed above.

Previous attempts have been made to prevent an animal from irritating bandages and wounds by providing similar protective garments such as by Caditz, U.S. Des. No. 374,315 and also Zielinksi, U.S. Pat. No. 4,355,600. Many additional modifications and variations of the POST SURGICAL PROTECTIVE GARMENT FOR QUADRAPEDS of the present invention are possible in light of the above teachings. It is therefore to be understood that within the scope of the appended claims, the invention may be practiced otherwise than as specifically described herein

What is claimed is:

1. A protective garment for quadrupeds comprising:
   a. a torso portion that is configured to cover the quadruped's torso, the torso portion comprising:
      i. a first side;
      ii. a second side;
      iii. an attachment mechanism for securing the first side to the second side; and
      iv. an attachment strap that is configured to pass in front of the quadruped's thoracic region, the attachment strap having a first end that is coupled to the first side and a second end that is releasably coupled to the second side using a securing mechanism;
   b. a head portion for at least partially covering the head of the quadruped, the head portion comprising:
      i. two sides;
      ii. a first strap having a first end connected to one of the two sides and a second end that is releasably coupled to the other of the two sides, wherein the first strap is configured to fit under a chin area of the quadruped; and
      iii. a second strap having a first end connected to one of the two sides and a second end that is releasably coupled to the other of the two sides, wherein the second strap is configured to fit across a bridge of a nose of the quadruped; and
   c. a leg portion that is configured to cover any one leg of the quadruped;
   wherein
      the leg portion is separate from and releasably attachable to the torso portion by a fastening mechanism; and
      the torso portion, the head portion, and the leg portion are all made from the same type of multi-directional stretch fabric.

2. The protective garment of claim 1, wherein the torso portion is configured to be positioned on a quadruped so that the first side and the second side is adjacent a back of the quadruped.

3. The protective garment of claim 1, wherein one or more of the attachment mechanism, the fastening mechanism or the securing mechanism is selected from a group consisting of:
   a. one or more hooks and eyes;
   b. one or more snaps;
   c. one or more buttons;
   d. one or more zippers; and
   e. hook and loop.

4. The protective garment of claim 1, where the torso portion further comprises one or more attachment loops that are configured to support a medical device.

5. The protective garment of claim 4, wherein the one or more attachment loops are formed from the multi-directional stretch fabric.

6. A protective garment for protecting quadrupeds, comprising:
   a. a torso portion comprising:
      i. a front edge,
      ii. a rear edge,
      iii. a first end that extends between the front and rear edges, and
      iv. a second end that extends between the front and rear edges,
   b. a head portion that is separate from the torso portion comprising:
      i. a front edge;
      ii. a rear edge;
      iii. a first side that extends between the front and rear edges;

iv. a second side that extends between the front and rear edges;
v. a first attachment mechanism having a first end coupled to one of the first side or the second side and a second end that is configured to be releasably attached to the other of the first side or the second side; and
vi. a second attachment mechanism having a first end coupled to one of the first side or the second side and a second end that is configured to be releasably attached to the other of the first side or the second side, wherein the torso portion is configured to releasably wrap around the torso of a quadruped such that:
a first portion of the front edge is positioned proximate the shoulders of the quadruped and a second portion of the front edge is positioned behind the elbows of the quadruped,
the back edge is positioned proximate the hips of the quadruped in front of the rear legs, and the first end, and
the second end are adjacent one another along the back of the quadruped so that the first end and the second end can be selectively coupled to one another along the back of the quadruped by a second fastener,
the first attachment mechanism is configured to be positioned under a chin area of the quadruped;
the second attachment mechanism is configured to be positioned across a bride of a nose of the quadruped; and
the head portion is configured so that when the head portion is positioned on the head of the quadruped, the back edge is proximate torso portion and the front edge is positioned intermediate the quadruped's ears and eyes.

7. The protective garment of claim 6, further comprising a thoracic strap that is coupled to the torso portion and that extends around the thoracic area of the quadruped to releasably attach the torso portion to the quadruped.

8. The protective garment of claim 7, wherein the thoracic strap further comprises:
   a. a first end coupled to the torso portion; and
   b. a second end releasably coupled to the torso portion.

9. The protective garment of claim 6, wherein one of the first attachment mechanism or the second attachment mechanism is selected from a group consisting of:
   a. one or more hooks and eyes;
   b. one or more snaps;
   c. one or more buttons;
   d. one or more zippers; and
   e. hook and loop.

10. The protective garment of claim 6, where the torso portion further comprises one or more attachment loops that are configured to support a medical device.

11. The protective garment of claim 10, wherein the one or more attachment loops are formed from a multi-directional stretch fabric.

12. The protective garment of claim 6, wherein the torso portion is formed from a multi-directional stretch fabric.

13. The protective garment of claim 6, wherein the second attachment mechanism is a strap.

14. The protective garment of claim 6, further comprising a leg portion that comprises:
   a. an elongated sleeve having a first end and a second end, wherein the elongated sleeve is configured to slip on a leg of a quadruped so that the first end is proximate the paw and the second end is proximate the torso portion; and
   b. a strap having a first end coupled to the second end of the elongated sleeve and a second end that is configured to be releasably coupled to the torso portion by a first fastener.

15. The protective garment of claim 14, wherein the first fastener is hook and loop.

16. A method of protecting a quadruped from aggravating a healing injury, the method comprises:
   a. providing a protective garment that comprises:
      i. a torso portion comprising:
         a front edge,
         a rear edge,
         a first end that extends between the front and rear edges, and
         a second end that extends between the front and rear edges; and
      ii. a head portion comprising a front edge, a rear edge, a first side that extends between the front and rear edges, a second side that extends between the front and rear a first attachment mechanism having a first end coupled to one of the first side or the second side and a second end that is configured to be releasably attached to the other of the first side or the second side, and a second attachment mechanism having a first end coupled to one of the first side or the second side and a second end that is configured to be releasably attached to the other of the first side or the second side;
   b. releasably attaching the torso portion to the quadruped so that:
      i. a first portion of the front edge is positioned proximate the shoulders of the quadruped,
      ii. a second portion of the front edge is positioned behind the elbows of the quadruped and the back edge is positioned proximate the hips of the quadruped in front of the quadruped's rear legs,
      iii. the back edge is positioned proximate the hips of the quadruped in front of the rear legs, and
      iv. the first end and the second end of the torso portion are adjacent one another along the back of the quadruped so that the first end and the second end can be selectively coupled to one another along the back of the quadruped by a first fastener;
   c. releasably attaching the second portion to one of a head or a leg of the quadruped, wherein the second portion is configured to be releasably attached to one of a leg or a head of the quadruped;
   d. wrapping the head portion around the head of the quadruped so that the front edge of the head portion is positioned intermediate the quadruped's ears and eyes and the back edge of the head portion is proximate the torso portion;
   e. releasably attaching the first attachment mechanism under the chin of the quadruped; and
   f. releasably attaching the second attachment mechanism across the bridge of the nose of the quadruped.

17. The method of claim 16, further comprising providing a leg portion comprising an elongated sleeve having a first end and a second end, the method further comprising:
   a. sliding the elongated sleeve on the leg of the quadruped so that the first end is proximate a paw of the leg and the second end is proximate the torso portion; and
   b. releasably attaching the second end of the elongated sleeve to the torso portion using the first fastener.

18. The method of claim 16, wherein the second attachment mechanism is a strap.

* * * * *